United States Patent
Li

(10) Patent No.: US 7,822,432 B2
(45) Date of Patent: Oct. 26, 2010

(54) SYSTEM OF GROUP COMMUNICATION AND A METHOD OF GROUP CALL PROCESSING BASED ON CDMA 2000 HIGH-SPEED PACKET DATA NETWORK

(75) Inventor: Liangbin Li, Shenzhen (CN)

(73) Assignee: ZTE Corporation (CN)

( * ) Notice: Subject to any disclaimer, the term of this patent is extended or adjusted under 35 U.S.C. 154(b) by 868 days.

(21) Appl. No.: 11/569,956

(22) PCT Filed: Jun. 2, 2004

(86) PCT No.: PCT/CN2004/000587

§ 371 (c)(1),
(2), (4) Date: Dec. 1, 2006

(87) PCT Pub. No.: WO2005/120103

PCT Pub. Date: Dec. 15, 2005

(65) Prior Publication Data

US 2007/0225024 A1    Sep. 27, 2007

(51) Int. Cl.
*H04B 7/00* (2006.01)
*H04M 3/00* (2006.01)

(52) U.S. Cl. .................. 455/518; 455/519; 455/517; 455/521; 455/416

(58) Field of Classification Search ............. 455/518, 455/519, 521, 426.1, 426.2, 517, 520, 416
See application file for complete search history.

(56) References Cited

U.S. PATENT DOCUMENTS

| | | | |
|---|---|---|---|
| 6,292,671 B1 * | 9/2001 | Mansour | 455/518 |
| 6,304,558 B1 * | 10/2001 | Mysore | 370/312 |
| 6,308,079 B1 | 10/2001 | Pan et al. | |
| 6,519,239 B1 | 2/2003 | Panchal et al. | |
| 7,206,595 B2 * | 4/2007 | Zufall | 455/519 |
| 7,254,119 B2 * | 8/2007 | Jiang et al. | 370/328 |
| 7,453,837 B2 * | 11/2008 | Jiang et al. | 370/320 |
| 7,630,345 B2 * | 12/2009 | Liu | 370/335 |
| 2003/0016632 A1 | 1/2003 | Refai et al. | |
| 2006/0003784 A1 * | 1/2006 | Chion et al. | 455/518 |

* cited by examiner

*Primary Examiner*—Tilahun Gesesse
(74) *Attorney, Agent, or Firm*—Brooks Kushman P.C.

(57) ABSTRACT

The present invention discloses a system of group communication and a method of group call processing based on CDMA2000 high-rate packet data network. The group communication system based on CDMA2000 high-rate packet data network includes: base station, packet control function module, packet data service node and AAA (authentication, authorization, accounting) server. The system further includes: multiple accessing terminals for making or responding the service request of group talk; group dispatching server for providing centralized control of group talk service, implementing the entire group talk service procedure from group user authentication to transmission of voice service package; group dispatch user side, which is an accessing gateway of group communication system, for providing signaling and service link between the base station and the group dispatching server. The present invention realizes the group communication system in the current high-rate packet data network, so that the group communication system satisfies the requirements of third generation communication, and adapts the development of the communication system.

12 Claims, 3 Drawing Sheets

SYSTEM OF GROUP COMMUNICATION AND A METHOD OF GROUP CALL PROCESSING BASED ON CDMA 2000 HIGH-SPEED PACKET DATA NETWORK

TECHNICAL FIELD OF THE INVENTION

The present invention relates to the group communication field, especially relates to a system of group communication and a method of group call processing based on CDMA2000 high-rate packet data network.

BACKGROUND ART OF THE INVENTION

Special dispatching communication system is a communication mode that appeared long ago, which is mainly used for special command, dispatching communication etc. The special dispatching communication system developed from the forms of one-to-one interphone, same-frequency simplex networking, different-frequency simplex (Bi-directional) networking to single channel one-call-hundreds-response and then selective calling system, and until the multi-channel automatic dialing system. In recent decade, the special dispatching communication system has developed to a higher level, and becomes a dispatching system that is shared by multi-channel users, being called the group communication system. One group system needs to have at least two functions, one is group calling, and the other is the function that the user can talk by pushing the "enter" key, without getting response from other users.

According to the technical mechanism adopted by the system, the group communication system can be divided into analog group communication system and digital group communication system. Currently, two kinds of widely used digital group communication systems of TDMA standard are iDEN (integrated Digital Enhanced Network) digital group communication system and land trunk wireless TETRA (Terrestial trunked Radio) communication system.

Both the above two realizations of trunk communication adopt the second generation digital communication technology, and use the TDMA mode; But nowadays, with the increasing sophistication of the third generation communication technology, the TDMA standard mechanism has such shortcomings as not being able to evolve to 3G (the third generation communication) freely, limited capacity, low handoff success rate and low data throughput. TDMA now is unable to satisfy the increasingly high requirements of communication.

CDMA (Code Division Multiple Access) system has broadband spreading frequency air interface, and already has the method of realizing trunk service in the CDMA2000 1x system. CDMA2000 HRPD (High Rate Packet Data) is based on data service, and it provides packet data service of high-rate. If CDMA2000 HRPD technology is combined with the group communication, the combination can not only exert the advantages of CDMA2000 HRPD technology, but can also satisfy the trunk service request of users, such as cluster-calling, group-calling and so on. But the existing HRPD system is only aimed at the needs of the trunk service, it is not capable to support the requirements of trunk communication function yet.

SUMMARY OF THE INVENTION

The present invention aims to provide a system of group communication and a method of group call processing based on CDMA2000 HRPD network, combining the CDMA2000 HRPD cellular system with the special dispatching communication system so as to realize the group communication function in CDMA system.

In order to realize the above aims, one aspect of the present invention is to provide a group communication system based on CDMA2000 high-rate packet data network, comprising: base station, packet control function module, packet data service node and AAA (authentication, authorization, accounting) server. The system also comprises: multiple accessing terminals for making or responding service request of group talk; group dispatching server for providing centralized control of group talk service, implementing the whole group talk service procedure from group user authentication to transmission of voice service packet; group dispatch user side, which is the accessing gateway of the group communication system, for providing signaling and service link between the base station and the group dispatching server.

Preferably, the group dispatching server further includes: an authentication module, for authenticating the accessing terminal which makes the service request of group talk; an arbitration module, for arbitrating the start-calling priority between multiple packets that make the service request of group talk and the talking priority between the multiple accessing terminals in the packet implementing group talk; a calling establishing module, for sending group talk establishment to the other users in the group allowing for group talk, and requesting the base station to allocate air resource and finite-side resource for the accessing terminal that establishes the talk; a copying and distributing module, for copying the voice service package from the base station and distributing it to other accessing terminals in the group implementing group talk through the allocated resources.

Preferably, the accessing terminal is of dual-mode terminal, having voice function, and equipped with voice encoder and decoder; the group communication system also has buffer mechanism, for buffering the voice service packages transmitted by the forward channel and reverse channel of the group communication system; the group dispatching server adopts the technology of selectively distributing packet data; the hardware structure of the group dispatching user side is compatible with the packet control function system in CDMA2000 system.

Preferably, the interface between the base station and the group dispatching user side is based on the standard A8/A9 interface, and its protocol stack is same with that of A8/A9 interface in CDMA2000 system; the interface between the group dispatching user side and the group dispatching server is based on the standard A10/A11 interface, and its protocol stack is same with that of A10/A11 interface in CDMA2000 system.

According to another aspect of this invention, it provides a method of group call processing employing the group communication system, including the steps of: the accessing terminal in one group of the group communication system making a service request of group talk; the base station receiving the service request of group talk and sending the request to the group dispatching server through the group dispatching user side; the group dispatching server establishing group talk service in the group for the accessing terminal.

Preferably, the following steps are also included prior to the step of making a service request of group talk: establishing signaling links between the base station, the group dispatching user side and the group dispatching server; sending a group registering message to the group dispatching server after an accessing terminal in the group starts up.

Preferably, the receiving and sending steps further include the steps of: the base station allocating the aerial resource for the accessing terminal, and establishing connecting link for the accessing terminal; the base station sending the service request of group talk from the accessing terminal to the group dispatching server through the group dispatching user side; establishing service link between the base station, the group dispatching user side and the group dispatching server.

Preferably, the steps of establishing group call further include: the group dispatching server sending request of establishing group talk service to the other accessing terminals of the group through the group dispatching user side and the base station; the other accessing terminals of the group responding to the request of establishing group talk service; the group dispatching server arbitrating and authorizing the responds from different accessing terminals in the group, determining talk priority of the different accessing terminals; the group dispatching server copying the voice frame sent by the base station through the group dispatching user side, and distributing to the other accessing terminals in the group which are authorized the call.

Preferably, the request of establishing group talk service is sent to the other accessing terminals in the group by the format of page message.

Preferably, the method also includes: when a plurality of accessing terminals of different groups send the service request of group talk simultaneously, the group dispatching server performs arbitration for multiple different groups implementing group talk, and determines the priority of said multiple different groups implementing group talk service.

The group communication system and the method of group call processing based on CDMA2000 high-rate packet data network of the present invention not only exerts the technological advantages of CDMA2000 HRPD system, but also realizes the group communication service of users. The system and method of this invention overcome the shortcomings of TDMA beehive group communication system in terms of system capacity and success ratio of switching, providing a new service for the high-rate packet data system.

BRIEF DESCRIPTION OF THE DRAWINGS

The following descriptions on the embodiments of the present invention in combination with the appended drawings will facilitate people's understanding on the above characters, merits and aims of this invention.

PREFERRED EMBODIMENTS OF THE PRESENT INVENTION

Next, the preferred embodiments of the present invention will be illustrated in detail in combination with the appended drawings.

Figure 1:
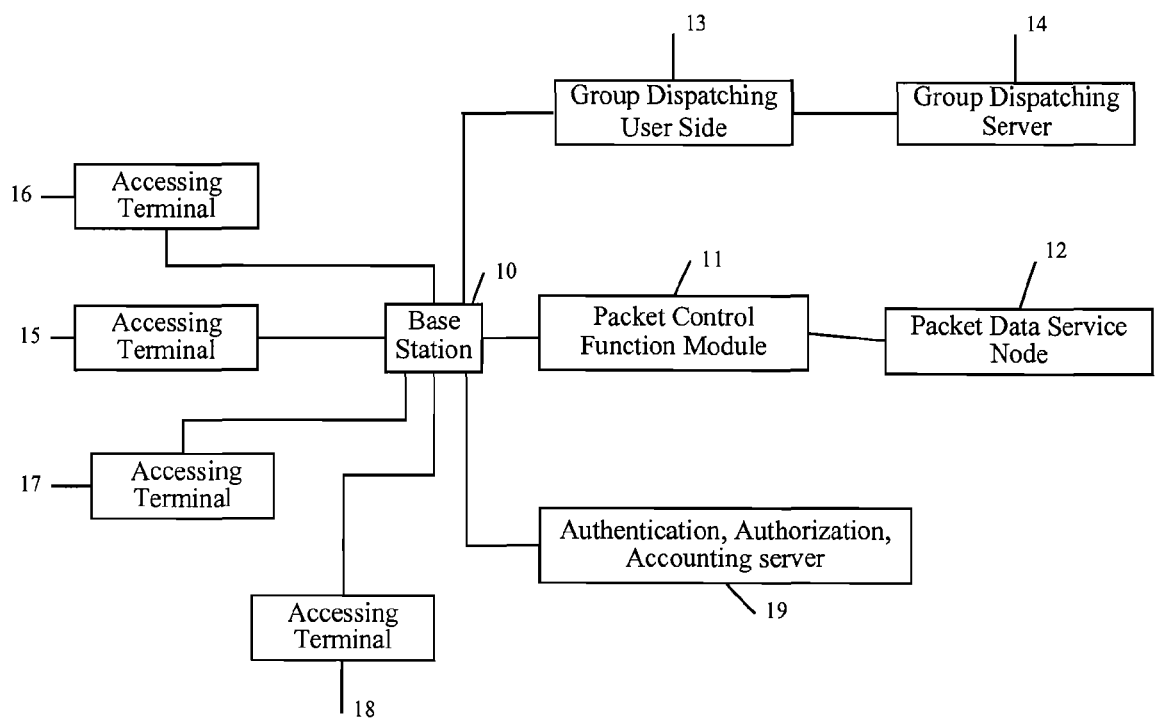
FIG. 1 is a diagram of group communication system based on CDMA2000 high-rate packet data network according to one embodiment of the present invention.

FIG. 1 is a diagram of group communication system based on CDMA2000 high-rate packet data network according to one embodiment of the present invention. The group communication system of the present embodiment is realized in the existing CDMA2000 HRPD system. The present embodiment adds the accessing terminals, group dispatching user side and group dispatching server, which support the group service, to the current HRPD system structure.

As shown in FIG. 1, the group communication system of the present embodiment includes base station 10, packet control function module 11, packet data service node 12, authentication, authorization, accounting server 19, group dispatching user side 13, group dispatching server 14, and a plurality of accessing terminals, such as accessing terminals 15, 16, 17, 18 and so on.

Different from the accessing terminal in HRPD system which only has data service, the accessing terminal 15, 16, 17, 18 have the function of group talk service, are of dual-mode terminals, have the voice function and are equipped with the voice encoder and decoder.

The function of the group dispatching user side 13 is, being the accessing gateway of the high-rate packet data network, to provide signaling and service links between the base station and group dispatching server. The hardware structure of the group dispatching user side 13 is compatible with the packet control function module 11 in the CDMA2000 HRPD system.

The group dispatching server 14 is the centralized control node of the group talk service, for authenticating the group user, establishing group call, arbitrating the call request between the group users, copying and distributing the voice package.

Figure 2:
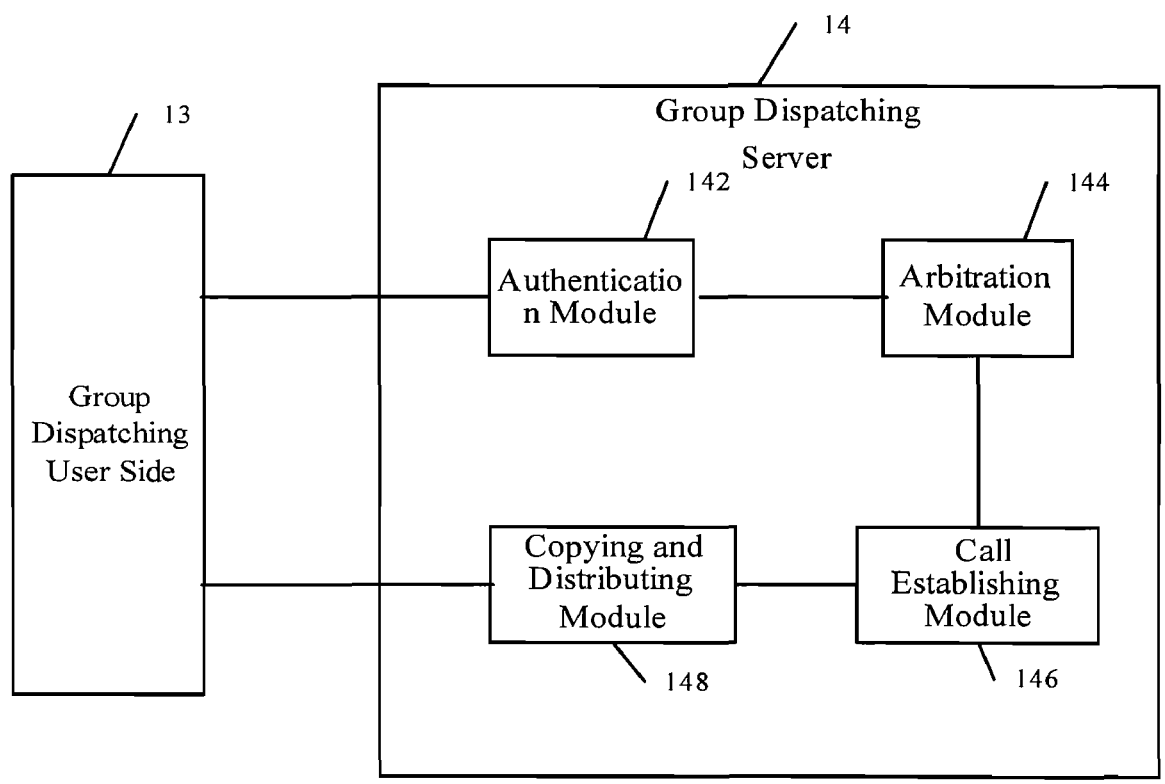
FIG. 2 is a diagram of group dispatching server in the group communication system based on CDMA2000 high-rate packet data network according to one embodiment of the present invention.

FIG. 2 is a diagram of group dispatching server in the group communication system based on CDMA2000 high-rate packet data network according to one embodiment of the present invention. As shown in FIG. 2, the group dispatching server 14 of the present embodiment includes authentication module 142, arbitrating module 144, call establishing module 146, copying and distributing module 148. The Authentication module 142 is for authenticating the accessing terminal making service request of group talk in the present embodiment system. Arbitrating module 144 is for arbitrating the start-calling priority between multiple groups making the service request of group talk simultaneously and the calling priority between multiple users in the group implementing the group talk, thereby determining the sequence of using the system resources. The call establishing module 146 is for sending group talk establishment to other users in the group allowed for implementing group talk, and requesting the base station to allocate the aerial resource and the finite-side resource for the accessing module establishing the talk. The copying and distributing module 148 is for copying the voice service package transmitted by the start-calling accessing terminal through the base station, and distributing the voice service package to other accessing terminals in the group through the distributed resources.

The group dispatching server 14 employs the technology of selectively distributing packet data, enabling the system of the present embodiment support a large quantity of group users, thus having a high requirement on the dispatching algorithm; and greatly improving the capability of the system of the present embodiment, increasing from the index of processing only 20-30 group users in circuit domain to the processing capability of supporting 100,000 users in each group.

The interface between the base station 10 and the group dispatching user side 13 is based on the standard A8/A9 interface, and its protocol stack is same with that of the A8/A9 interface in CDMA2000 system; The interface between the group dispatching user side 13 and the group dispatching server 14 is based on the standard A10/A11 interface, and its protocol stack is same with that of the A10/A11 interface in CDMA2000 system.

Figure 3:
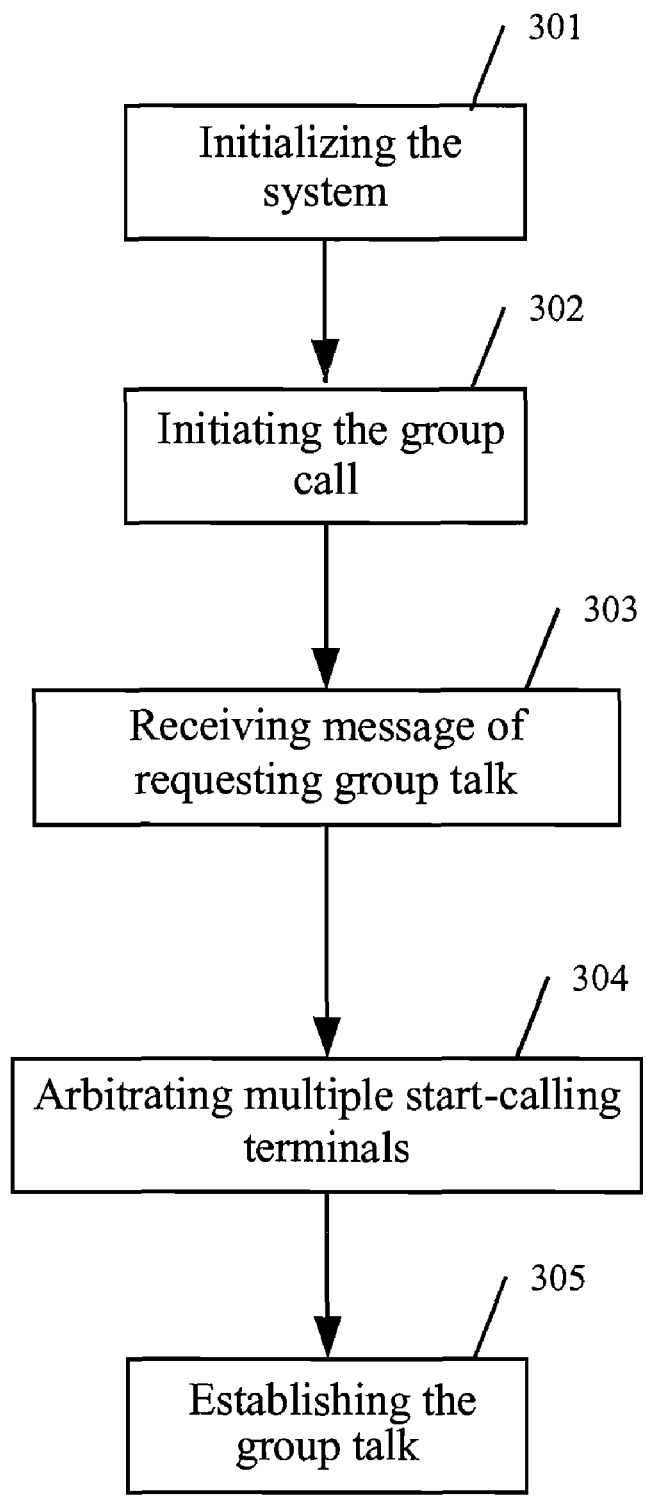
FIG. 3 is a flowchart of the method of group call processing employing the group communication system based on CDMA2000 high-rate packet data network according to one embodiment of the present invention.

Under the same inventive concept, FIG. 3 is a flowchart of the method of group call processing employing the group communication system based on CDMA2000 high-rate packet data network according to one embodiment of the present invention. The method of the present embodiment is to employ the group processing method of group communication system in the preceding embodiment.

FIG. 3 shows the employ of the group call processing method of group communication system. In this embodiment, it is supposed that the accessing terminals 15, 16, 17 are in one group 1, and the accessing terminal 18 is in another group 2.

In step 301, the group communication system is initialized, which means, the signaling link between the base station 10 and the group dispatching user side 13, the group dispatching user side 13 and the group dispatching server 14 is established, for loading the aerial information and the control information of group talk service, each group dispatching user side has one such link, and is shared by all the users who establish call in the group dispatching user side. This initialization stage also includes: when one accessing terminal in a group of this system starts up, it initiates a registration message to the authentication, authorization, accounting server 19, and also initiates a group registration message to the group dispatching server 14.

In step 302, the accessing terminal in one group of the group communication system initiates service request of group talk. In this embodiment, it is supposed that accessing terminal 15 in group 1 initiates the service request of group talk.

In step 303, the base station receives and sends the service request of group talk to the group dispatching server through the group dispatching user side. The base station 10 allocates aerial resource for the accessing terminal 15 initiating the service request of group talk, establishes connecting link for receiving request message and voice service package; and the base station sends the message of the accessing terminal 15 initiating the group request to the group dispatching server through the group dispatching user side; and service link is established between the base station, group dispatching user side and group dispatching sever for sending the voice service package of accessing terminal 15.

In step 304, when accessing terminals of a plurality of different groups initiate the service request of group talk simultaneously, the group dispatching sever arbitrates the group talk for the plurality of different groups, and determines the priority of the plurality of different groups implementing the group talk service. In this embodiment, when the accessing terminal 15 in group 1 and the accessing terminal 18 in group 2 initiate the service request of group talk simultaneously, the group dispatching server 14 arbitrate the priority of group talk between group 1 and group 2, so as to determine the sequence of group start-calling between the accessing terminal 15 and accessing terminal 18. In this embodiment, if the priority of group start-calling of group 1 is higher than that of group 2, then the group talk request of accessing terminal 15 will be accepted preferentially.

In step 305, the group dispatching server establishes the group talk service in the group for the accessing terminal. After the group dispatching server 14 receives the group talk request of accessing terminal 15 from the base station 10, it sends the request of establishing group talk service to other accessing terminals 16, 17 in group 1 through the group dispatching user side 13 and the base station 10, and the request of establishing group talk service is sent in the format of paging message; after the accessing terminals 16, 17 in group 1 receives the establishing request, they respond to the request of establishing group talk service to the group dispatching server respectively; the group dispatching server 14 arbitrates and authorizes the talk priority of the accessing terminal 16, 17 of group 1 which make response to the request, and determines the consequence of the different accessing terminals 16 and 17 in group 1 implementing the group talk, if the talk priority of the accessing terminal 16 is higher than that of the accessing terminal 17, then the accessing terminal 17 will be allowed to implement the group talk of this time preferentially; the group dispatching server 14 copies the group talk voice service package of start-calling accessing terminal 15 sent from the base station 10 through the group dispatching user side 13, and distributes the group talk voice service package to other accessing terminals in group 1 which are authorized to talk according to the determined priority of talk sequence, that is, first sends to the accessing terminal 16, then to the accessing terminal 17, and so on and so forth.

It has to be pointed out that, at the base station side of the group communication system of this invention, the voice service package is dispatched as a special data service package, so as to ensure high priority of voice service package, satisfy the requirements of time-delay.

It also has to be pointed out that, when the group communication system of this invention is implementing group talk, the mechanism of buffering a certain amount of voice service packages is adopted, so as to make full use of the aerial resource. Specifically speaking, if the reverse rate exceeds 9.6 kbps, supposing the reverse rate can reach to R kbps, then each R rate physics frame can send R/9.6 voice service packages of rate 9.6 kbps, then the voice service packages are send to the group dispatching server and the base station where one or several target users in the group locate, by employing the established link and through the forward service channel, the dispatching server is able to buffer R/9.6 voice service packages of rate 9.6 kbps if the DRC application rate of accessing terminal reaches Vbps. By adopting this buffer mechanism, the forward and reverse aerial resources can be fully utilized.

Although several demonstrative embodiments are given above to describe in detail the group communication system and the method of group call processing based on CDMA2000 high-rate packet data network of the present invention, the present invention is not confined to the above embodiments. People skilled in the art can realize various changes and modifications in the spirit and scope of the present invention. Therefore, the present invention does not limit to the above embodiments, the protection scope of the present invention is based on the appended claims.

What I claim is:

1. A group communication system based on CDMA2000 high-rate packet data network, comprising a base station, a packet control function module, a packet data service node and an AAA (authentication, authorization, accounting) server, further comprising:

multiple accessing terminals, for making or responding a service request of group talk;

a group dispatching server, for providing centralized control of group talk service, implementing the whole group talk service procedure from group user authentication to transmission of voice service packets; and a group dispatching user side, being an accessing gateway of the group communication system, for providing signaling and service link between the base station and the group dispatching server;

wherein said group dispatching server further includes:
an authentication module, for authenticating the accessing terminal which makes the service request of group talk;
an arbitration module, for arbitrating the start-calling priority between multiple groups that make the service request of group talk and the talking priority between the multiple accessing terminals in the group which implement the group talk;
a calling establishing module, for sending group talk establishment to other users in the group allowed for the group talk, and requesting the base station to allocate aerial resource and finite-side resource for the accessing terminals that establish the talk; and
a copying and distributing module, for copying the voice service packages from the base station and distributing the voice service packages to other accessing terminals in the group implementing the group talk through the allocated resources.

2. The system of claim 1, wherein said multiple accessing terminals are of dual-mode terminal, have voice function, and are equipped with voice encoder and decoder.

3. The system of claim 1, which further has a buffer mechanism, for buffering the voice service packages transmitted by forward channel and reverse channel of the group communication system.

4. The system of claim 1, wherein said group dispatching server adopts the technology of selectively distributing packet data.

5. The system of claim 1, wherein hardware structure of said group dispatching user side is compatible with packet control function system in CDMA2000 system.

6. The system of claim 1, wherein interface between the base station and the group dispatching user side is based on standard A8/A9 interface, and protocol stack of the interface is same with that of the A8/A9 interface in CDMA2000 system.

7. The system of claim 1, wherein interface between the group dispatching user side and the group dispatching server is based on standard A10/A11 interface, and protocol stack of the interface is same with that of the A10/A11 interface in CDMA2000 system.

8. A method of group call processing of the group communication system cited in claim 1, including the following steps of:
the accessing terminals in one group of said group communication system initiating a service request of group talk;
the base station receiving the service request of group talk and sending the request to the group dispatching server through the group dispatching user side;
the group dispatching server establishing group talk service in the group for the accessing terminal;
wherein said step of establishing group talk service further includes:
the group dispatching server sending request of establishing group talk service to other accessing terminals of the group through the group dispatching user side and the base station;
said other accessing terminals of the group responding to the request of establishing group talk service;
the group dispatching server arbitrating and authorizing the response from the different accessing terminals in the group, determining talk priority of the different accessing terminals;
the group dispatching server copying voice frame sent by the base station through the group dispatching user side, and distributing the voice frame to the other accessing terminals in the group which are authorized the call.

9. The method of claim 8, wherein the following steps are also included prior to the step of initiating a service request of group talk:
establishing signaling links between the base station, the group dispatching user side and the group dispatching server;
sending a group registering message to the group dispatching server after an accessing terminal in the group starts up.

10. The method of claim 8, wherein said receiving and sending steps further include the following steps of:
the base station allocating aerial resource for the accessing terminal, and establishing connecting link for the accessing terminal;
the base station sending the service request of group talk from the accessing terminal to the group dispatching server through the group dispatching user side;
establishing service link between the base station, the group dispatching user side and the group dispatching server.

11. The method of claim 8, wherein said request of establishing group talk service is sent to the other accessing terminals in the group by the format of page message.

12. The method of claim 8, which further includes the following steps of:
when a plurality of accessing terminals of different groups send the service request of group talk simultaneously, the group dispatching server performing arbitration on implementing group talk for said multiple different groups, and determining the priority of implementing group talk service for said multiple different groups.

* * * * *